US012630186B2

(12) United States Patent
Minami

(10) Patent No.: US 12,630,186 B2
(45) Date of Patent: May 19, 2026

(54) DRIVING SUPPORT DEVICE AND DRIVING SUPPORT METHOD

(71) Applicant: TOYOTA JIDOSHA KABUSHIKI KAISHA, Toyota (JP)

(72) Inventor: Yui Minami, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 173 days.

(21) Appl. No.: 18/398,658

(22) Filed: Dec. 28, 2023

(65) Prior Publication Data

US 2024/0300532 A1 Sep. 12, 2024

(30) Foreign Application Priority Data

Mar. 6, 2023 (JP) ................................. 2023-033665

(51) Int. Cl.
*B60W 60/00* (2020.01)
*B60W 50/14* (2020.01)
*G10L 15/22* (2006.01)
(52) U.S. Cl.
CPC ........ *B60W 60/0013* (2020.02); *B60W 50/14* (2013.01); *G10L 15/22* (2013.01); *B60W 2540/21* (2020.02); *G10L 2015/223* (2013.01)
(58) Field of Classification Search
CPC ....... B60W 2050/146; B60W 2540/21; B60W 2540/215; B60W 30/143; B60W 50/10; B60W 50/14; B60W 60/0013; G10L 15/22; G10L 15/26; G10L 15/30; G10L 2015/223
See application file for complete search history.

(56) References Cited

U.S. PATENT DOCUMENTS

| | | | |
|---|---|---|---|
| 9,964,950 | B2 | 5/2018 | Takano |
| 10,017,116 | B2 | 7/2018 | Sato |
| 10,310,508 | B2 | 6/2019 | Kunisa et al. |
| 10,452,930 | B2 | 10/2019 | Sato |
| 10,663,973 | B2 | 5/2020 | Hashimoto et al. |
| 10,895,875 | B2 | 1/2021 | Hashimoto et al. |
| 11,001,198 | B2 | 5/2021 | Morimura et al. |
| 11,275,382 | B2 | 3/2022 | Hashimoto et al. |
| 2020/0135193 | A1 | 4/2020 | Hayashi |
| 2021/0114584 | A1 | 4/2021 | Hiratsuka et al. |
| 2021/0229598 | A1 | 7/2021 | Morimura et al. |
| 2021/0380124 | A1 | 12/2021 | Urano et al. |

(Continued)

FOREIGN PATENT DOCUMENTS

| | | |
|---|---|---|
| JP | 2020-069920 A | 5/2020 |
| JP | 2021-066226 A | 4/2021 |

*Primary Examiner* — Fadey S. Jabr
*Assistant Examiner* — Michael J Herrera
(74) *Attorney, Agent, or Firm* — SoraIP, Inc.

(57) ABSTRACT

The driving support device includes an acquisition unit that acquires the driver's input results, and an output control unit that outputs a confirmation voice requesting the driver's consent in response to the driver's input for executing the driving support function. A determination unit that determines execution of the driving support function in response to the driver's input to the confirmation voice. The output control unit outputs the text in which the keyword is set as a confirmation voice. The determination unit does not accept the driver's approval for the confirmation voice before outputting the keyword.

5 Claims, 3 Drawing Sheets

(56) References Cited

U.S. PATENT DOCUMENTS

| 2022/0230636 A1* | 7/2022 | Wang | ................... B60R 16/0373 |
| 2022/0324449 A1* | 10/2022 | Shi | ...................... B60W 30/143 |
| 2024/0416969 A1* | 12/2024 | Fan | ......................... G01C 21/26 |

* cited by examiner

1

DRIVING SUPPORT DEVICE AND DRIVING SUPPORT METHOD

CROSS-REFERENCE TO RELATED APPLICATION

This application claims priority to Japanese Patent Application No. 2023-033665 filed on Mar. 6, 2023, incorporated herein by reference in its entirety.

BACKGROUND

1. Technical Field

The present disclosure relates to driving support technology that supports driving by a driver.

2. Description of Related Art

Japanese Unexamined Patent Application Publication No. 2020-69920 (JP 2020-69920 A) discloses a driving support device that recognizes the content of voice information uttered by a driver, outputs information about the content of a process based on the result of recognizing the voice information to a meter before executing the process, and executes the process when an approval signal for approving execution of the process is input from an approval switch disposed on a steering wheel.

SUMMARY

In the technology described in JP 2020-69920 A, the driving support device outputs the content of the process to the meter to prompt the driver for confirmation, but the process is executed even if the driver presses the approval switch without seeing the meter. Therefore, it is desirable if the user can make a confirmation without seeing the meter display.

An object of the present disclosure is to provide driving support technology that executes a driving support function by allowing a driver to make an appropriate confirmation.

In order to address the above issue, an aspect of the present disclosure provides a driving support device including:

an acquisition unit that acquires a result of input by a driver;

an output control unit that outputs a confirmation voice requesting approval by the driver in response to input by the driver for executing a driving support function; and a determination unit that determines execution of the driving support function in response to input by the driver for the confirmation voice.

The output control unit outputs a text with a set keyword as the confirmation voice.

The determination unit does not receive the approval by the driver for the confirmation voice before the keyword is output.

Another aspect of the present disclosure provides a driving support method. This method is a driving support method, each step of which is executed by a driving support device of a vehicle, the driving support method including:

acquiring input by a driver for executing a driving support function;

outputting a confirmation voice constituted of a text with a set keyword in response to the input by the driver;

acquiring input by the driver for the confirmation voice; and determining execution of the driving support function in response to the input by the driver.

Approval made by the driver for the confirmation voice before the keyword is output is not received in the determining.

According to the present disclosure, it is possible to provide a vehicle control device that allows a driver to grasp the travel state of a vehicle when starting follow-up control.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
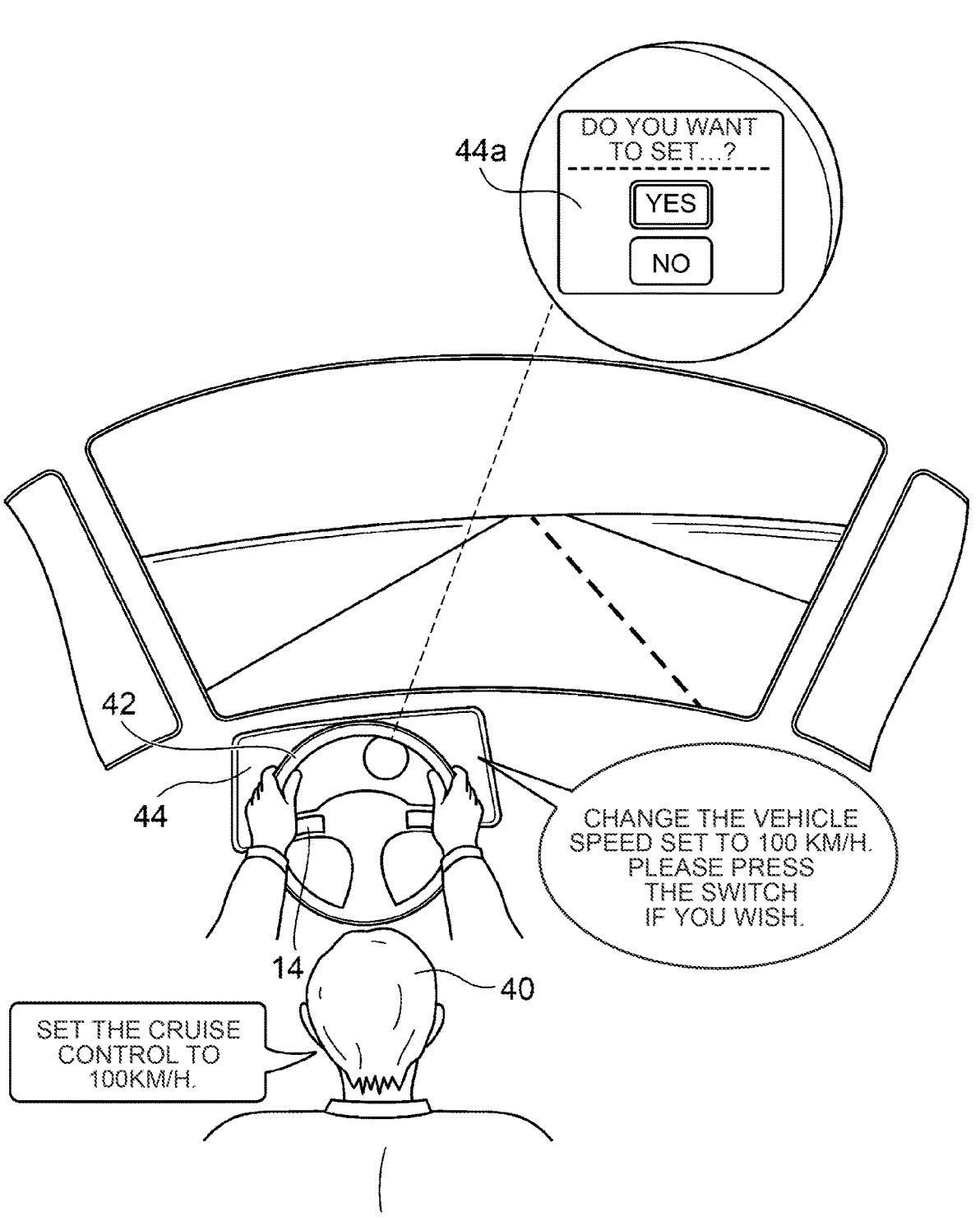
FIG. 1 is a diagram for explaining an overview of a driving support system according to an embodiment.

FIG. 1 is a diagram for explaining an overview of a driving support system according to an embodiment. The driving support system of the embodiment executes a driving support function that supports the driving of the driver 40. The driving support function includes an automatic driving function that causes the vehicle to travel autonomously, and may be, for example, cruise control, collision avoidance control, follow-up control, etc. Cruise control is a control that automatically drives a vehicle at a set speed.

In FIG. 1, the driver 40 has his hands on the steering wheel 42, and the driving support system is executing cruise control. The steering wheel 42 is provided with an input switch 14. The input switches 14 include a switch for moving a cursor and a switch for inputting a decision.

The driver 40 can input by voice whether or not the driving support function is to be executed and the settings of the function. For example, in FIG. 1, driver 40 says, "Set the cruise control to 100 km/h" and is giving a voice command to change the vehicle speed using cruise control.

In response, the driving support system recognizes what driver 40 says and outputs the confirmation sound of "The set vehicle speed is changed to 100 km/h. Please press the switch if you wish". This confirmation voice requests consent from the driver 40 as to whether the driving support system may execute the driving support function according to the voice command of the driver 40. At this time, the display area 44a of the instrument panel 44 displays "Do you want to set the cruise control to 100 km/h?", "YES", and "NO". The cursor is positioned on "YES". If the driver 40 continues to input the decision switch, it means that the driver 40 has accepted the request.

The driver 40 operates the input switch 14 in response to the confirmation voice and inputs whether or not he consents. When the driver 40 agrees to the confirmation voice, the driving support system executes the driving support function. In other words, even if the driver 40 instructs the execution of the driving support function by a voice command, the driving support function will not be executed unless the driver 40 responds to the confirmation voice with acceptance or rejection. Thereby, even if the driving support system erroneously recognizes a voice command, an appropriate confirmation is executed, so that the possibility of executing a misrecognized driving support function can be reduced.

It would be troublesome if the driver 40 could not accept the confirmation voice until the end, so the driving support system accepts input from the input switch 14 even while outputting the confirmation voice. However, if the driver 40 accepts the confirmation voice immediately after the confirmation voice starts, it means that the driver 40 does not understand the content of the confirmation voice at all, and it becomes useless for the driving support system to output the confirmation voice.

Therefore, the driving support system of the embodiment arranges a keyword that the driver 40 wants to recognize in the text of the confirmation voice, does not accept consent before outputting the keyword, but accepts consent after outputting the keyword. Thereby, the driving support system can start the driving support function by making the driver 40 recognize the important part of the content shown in the confirmation voice.

Figure 2:
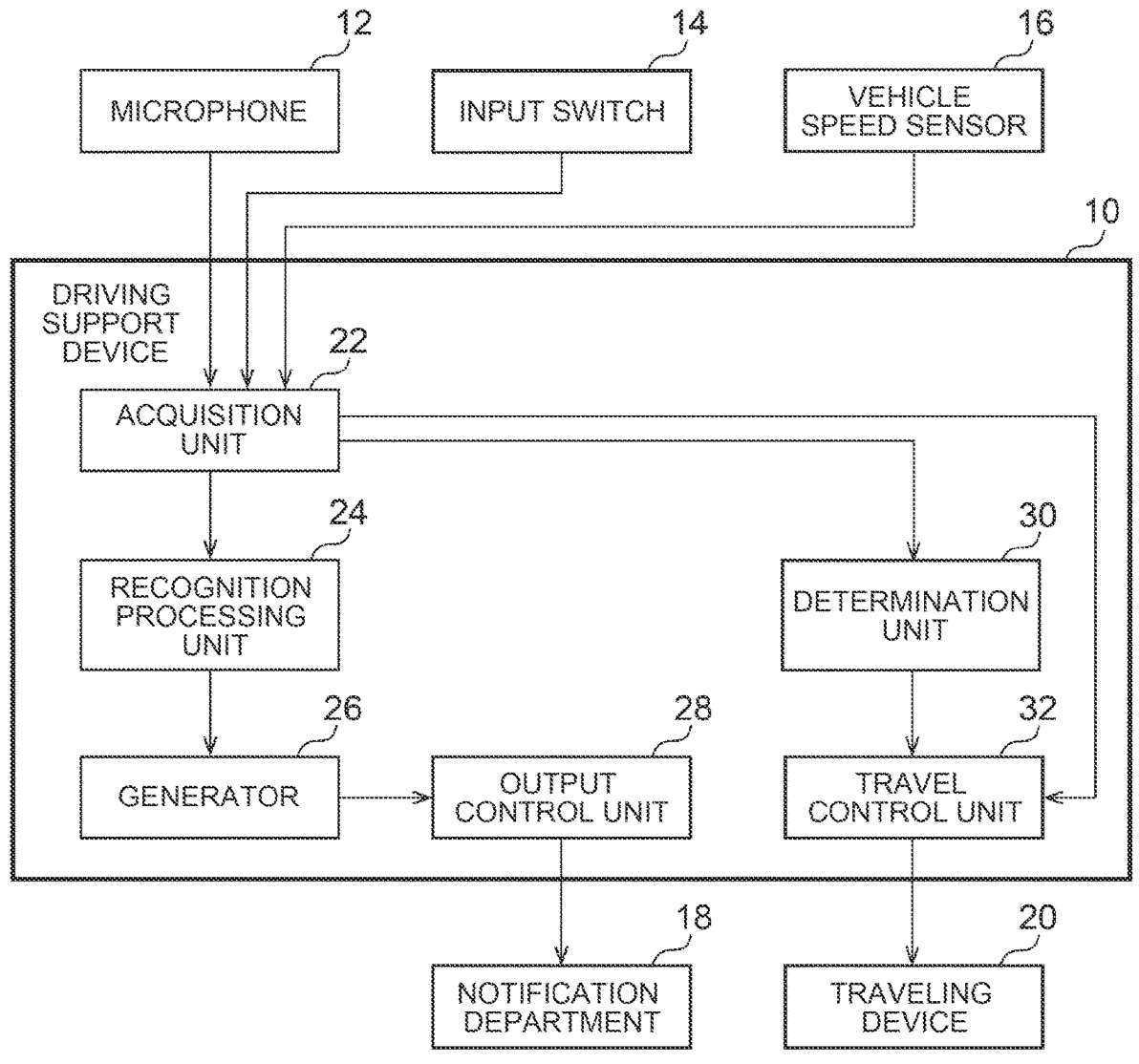
FIG. 2 is a diagram showing the functional configuration of the driving support system.

FIG. 2 is a diagram showing the functional configuration of the driving support system 1. In terms of hardware, each function of the driving support system 1 can be configured with circuit blocks, memory, and other LSIs, and in terms of software, it is realized by system software, application programs, etc. loaded into memory. Therefore, those skilled in the art will understand that each function of the driving support system 1 can be realized in various ways using only hardware, only software, or a combination thereof, and is not limited to any one of them.

The driving support system 1 includes a driving support device 10, a microphone 12, an input switch 14, an on-vehicle sensor 16, a notification unit 18, and a traveling device 20. The driving support device 10 executes a driving support function, particularly a driving support function related to automatic driving.

The microphone 12 functions as a sound detection unit that detects sounds inside the vehicle cabin. Thereby, the voice of the driver 40 can be detected. A plurality of microphones 12 may be provided in the vehicle cabin, and the voice of the driver 40 may be recognized based on the detection results of the plurality of microphones 12. For example, the voice may be recognized as the voice of the driver 40 based on the difference in volume between the plurality of microphones 12.

The input switch 14 is provided on the steering wheel 42 as shown in FIG. 1, and functions as an operation input unit. Note that instead of the input switch 14, a touch pad or a microphone may function as the operation input unit.

The on-vehicle sensor 16 is an object detection sensor or a driving state detection sensor, and is used to execute a driving support function. The object detection sensor includes an on-vehicle camera, a millimeter wave radar, an optical radar, a sound wave sensor, and the like, and detects objects located around the vehicle. The running state detection sensor includes a vehicle speed sensor, a steering angle sensor, an acceleration sensor, a brake pressure sensor, etc., and detects the running state of the vehicle. The detection results of the microphone 12, input switch 14, and on-vehicle sensor 16 are transmitted to the driving support device 10.

The notification unit 18 includes at least a speaker, and may include a display in addition to the speaker. The notification unit 18 notifies the driver 40 of information, for example, a speaker outputs a confirmation voice, and the display area 44a of the instrument panel 44 shown in FIG. 1 displays a selection screen corresponding to the confirmation voice.

The traveling device 20 includes a drive unit that applies driving force to the wheels and rotates the wheels to advance the vehicle, a steering unit that steers the wheels, and a braking unit that applies braking force to the wheels. The drive means may be an engine, a motor or a combination thereof. The traveling device 20 may be driven by a driver's operation or may be driven by automatic driving control.

The driving support device 10 includes an acquisition unit 22, a recognition processing unit 24, a generation unit 26, an output control unit 28, a determination unit 30, and a travel control unit 32. The acquisition unit 22 acquires input results from the driver 40 from the microphone 12 and the input switch 14, and acquires detection results from the on-vehicle sensor 16.

The recognition processing unit 24 recognizes the content of the utterance of the driver 40 based on the detection result of the microphone 12. The recognition processing unit 24 may recognize the content of the voice uttered by the driver 40 using a neural network technique, for example, a deep learning technique. If the utterance of the driver 40 is a voice command for executing a driving support function, the recognition processing unit 24 sends the type and content of the voice command to the generation unit 26. In particular, when the voice command is for executing a driving support function of automatic driving control, it is determined to output a confirmation voice. The confirmation voice is output in response to a driver's voice command, and does not need to be output in response to a voice command by a passenger other than the driver.

The generation unit 26 generates a confirmation voice in response to the voice command of the driver 40 in the form of text. The generation unit 26 reads a text template corresponding to the voice command, embeds a keyword in the template, and generates a confirmation voice text. The text of the confirmation voice requests permission from the driver 40 to execute the driving support function. The generation unit 26 also generates text to be displayed in display area 44a. The generation unit 26 sends the generated text to the output control unit 28 along with information indicating the position of the keyword.

An example of a text template for the confirmation voice is shown below.

(1) Template for voice command to change cruise control vehicle speed "Change the set vehicle speed to A km. Please enter the switch if you wish."

(2) Template for voice command to change the following distance between vehicles "Change the following distance to B. Please enter the switch if you wish."

(3) Template for voice command to turn on (or turn off) driving control function "Turn on the C function. Please enter the switch if you wish."

The keyword set by the generation unit 26 is "A km" in the above (1), an index indicating the "B" stage in the above (2), and "C function on" in the above (3). The generation unit 26 applies the recognition result of the recognition processing unit 24 to the keyword of the template. The keyword is not limited to one word, but may be composed of a plurality of words as shown in (3) above.

As shown in (1) to (3) above, the keyword set by the generation unit 26 is placed before the text that constitutes the confirmation voice. The preceding part of the text refers to the part that precedes the words that make up the text in order. Further, the keyword may be placed at the beginning of the text that constitutes the confirmation voice. In this way, by placing the keyword at the front of the text, the driving support device 10 can notify the driver 40 of important parts of the confirmation voice while speeding up the timing at which the driver 40 accepts consent. Note that the keyword may be set to start being output within at least one second after the confirmation voice starts being output. Further, the keyword may be set to start being output at the beginning or second word of the confirmation voice.

In (1) above, the instruction is to change the vehicle speed, so the vehicle speed is set as a keyword, and in (2) above, the instruction is to change the inter-vehicle distance, so an index of the inter-vehicle distance is set as the keyword. Furthermore, in (3) above, since the instruction is to turn on/off the travel control function, the keyword is set to indicate that the function is on/off. In this way, the keywords set by the generation unit 26 indicate changes in driving control when the driving support function is executed in response to instructions from the driver 40. Changes in driving control indicate the control portions that differ before and after execution when a driving support function is executed in response to a voice command. Thereby, changes in driving control can be communicated to the driver 40.

The output control unit 28 receives the text of the confirmation voice from the generation unit 26, and outputs the text as voice from the notification unit 18. Further, the output control unit 28 receives the selection display text corresponding to the confirmation voice from the generation unit 26, and outputs it as an image from the display area 44*a*. As shown in FIG. 1, since the cursor is initially placed at "YES" indicating approval, the driver 40 can approve by simply pressing the decision switch. If the driver 40 denies the request, he or she presses the move switch to move the cursor to "NO" and then presses the decision switch.

The output control unit 28 outputs a confirmation voice in response to voice input from the driver 40 for executing the driving support function. The confirmation voice requests consent from the driver 40, and has a keyword set therein.

The driver 40 responds to the confirmation voice by operating the input switch 14. This allows the driver 40 to confirm whether the driving support device 10 is incorrectly recognizing the voice input of the driver 40. The output control unit 28 determines that the keyword has been output based on the information indicating the position of the keyword, and sends information indicating that the keyword has been output to the determination unit 30.

The determination unit 30 determines execution of the driving support function in response to the input of the driver 40 in response to the confirmation voice. The determination unit 30 does not accept the approval of the driver 40 for the confirmation voice before outputting the keyword. This makes it possible to avoid accepting the approval of the driver 40 before the driver 40 understands the keyword. The determination unit 30 determines whether a keyword has been output based on the output result of the output control unit 28.

The determination unit 30 receives input from the driver 40 regarding the confirmation voice after outputting the keyword, and determines execution of the driving support function according to the received input. Thereby, the driver 40 can approve the confirmation voice even while the confirmation voice is being output. Before outputting the keyword may be before the output of the keyword is completed, and after outputting the keyword may be after the output of the keyword is completed.

The input of disapproval of the confirmation voice may be accepted after the keyword is output, similar to the input of approval, but it may be accepted regardless of the output of the keyword. In other words, the input of approval and the input of disapproval of the confirmation voice may be accepted at different timings, and the input of disapproval may be accepted before the input of approval.

The travel control unit 32 receives an instruction to execute the driving support function from the determination unit 30 and executes the driving support function. In particular, the travel control unit 32 executes a travel control function related to automatic driving. The travel control unit 32 generates a command value for controlling the traveling device 20 based on the detection result of the on-vehicle sensor 16, and sends it to the traveling device 20. The traveling device 20 is driven according to the received command value. Thereby, the driving support device 10 can cause the own vehicle to travel autonomously.

Figure 3:
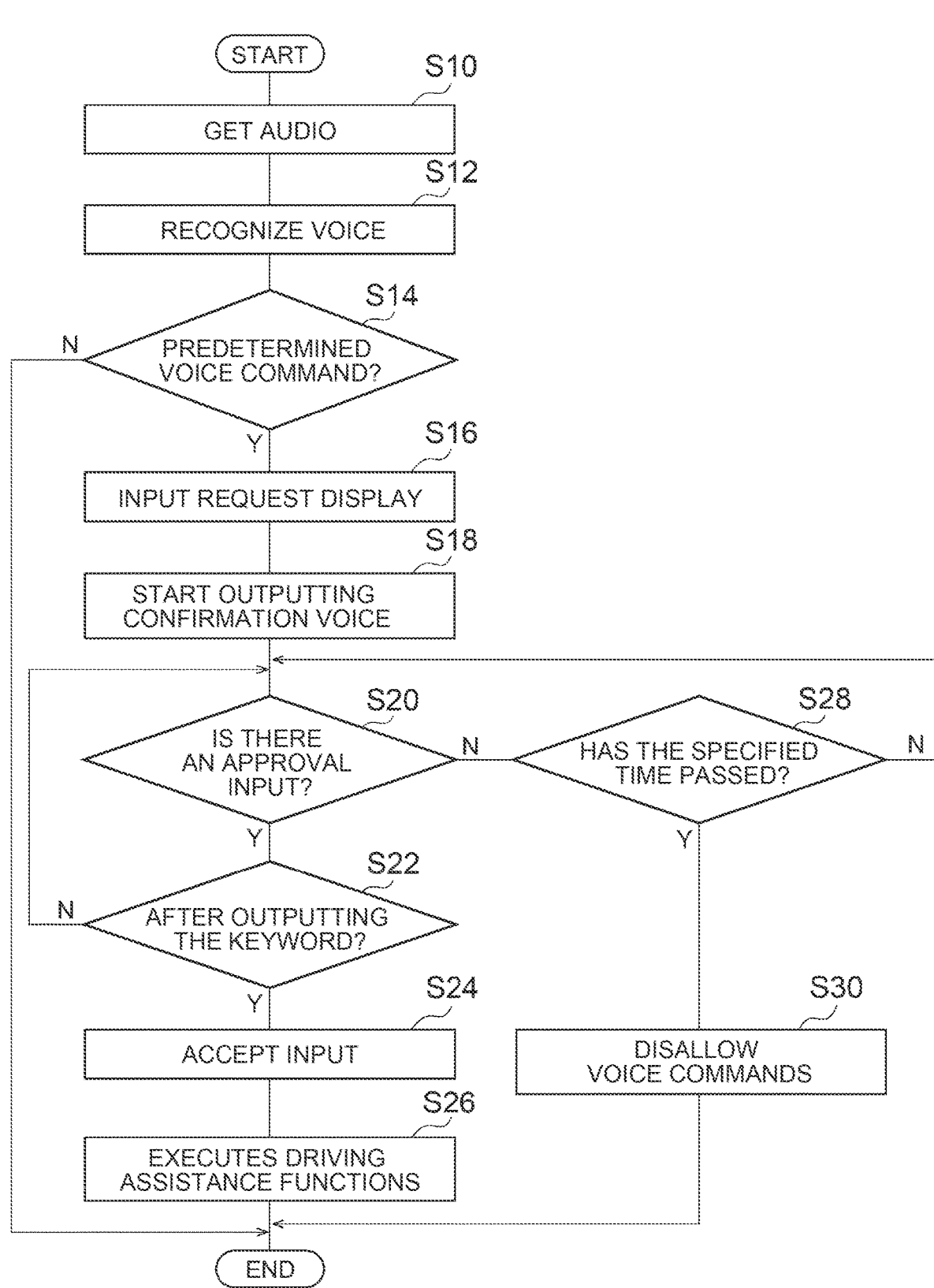
FIG. 3 is a flowchart of a process for starting execution of the driving support function according to the embodiment.

FIG. 3 is a flowchart of a process for starting execution of the driving support function according to the embodiment. The acquisition unit 22 acquires the sound inside the vehicle cabin from the microphone 12 (S10). The recognition processing unit 24 extracts the voice of the driver 40 from the sounds inside the vehicle cabin, and recognizes the voice of the driver 40 (S12). The recognition processing unit 24 determines whether the recognized voice of the driver 40 is a predetermined voice command (S14).

If the voice of the driver 40 is not a predetermined voice command (N at S14), the process ends. If the voice of the driver 40 is a predetermined voice command (Y of S14), the generation unit 26 generates display text and text for confirmation voice, and the output control unit 28 generates a selection image requesting input from the driver 40. is displayed in the display area 44*a* (S16). Further, the output control unit 28 starts outputting the confirmation voice generated by the recognition processing unit 24 (S18). A keyword is set in the text of this confirmation voice by the generation unit 26.

The acquisition unit 22 acquires the input result of the input switch 14, and the determination unit 30 determines whether the driver 40 has made an input in response to the confirmation voice (S20). If there is no input by the driver 40 (N in S20), it is determined whether a predetermined time has elapsed since the output of the confirmation voice started or ended (S28).

If the predetermined time has not elapsed since the output of the confirmation voice started or ended (N of S28), the determination unit 30 determines whether there is an input from the driver (S20). If a predetermined time has elapsed since the output of the confirmation voice started or ended (Y in S28), the voice command is disallowed and the process ends (S30).

If there is an input by the driver 40 (Y in S20), the determination unit 30 determines whether the keyword has been output based on the output result of the output control unit 28 (S22). If the keyword has not yet been output (N at S22), the input is not accepted, and the determination unit 30 determines whether there is an input from the next driver (S20). In other words, if the driver presses the input switch 14 immediately after outputting the confirmation voice, that input will not be accepted. Thereby, the driving support device 10 can avoid receiving consent from the driver 40 before notifying the driver 40 of the keyword.

If the keyword has been output (Y in S22), the determination unit 30 accepts the input from the driver 40 (S24), and if the input is approved, determines to execute the driving support function corresponding to the voice command. The travel control unit 32 executes the driving support function according to the determination by the determination unit 30

(S26). As a result, when the driver repeatedly presses the input switch 14 immediately after the confirmation voice is output, the input is not accepted until at least after the keyword is output, and the input is accepted after the keyword is output. Note that the input of denial may be accepted before outputting the keyword.

The present disclosure has been described above based on examples. The present disclosure is not limited to the embodiments described above, and various modifications such as design changes can be made based on the knowledge of those skilled in the art.

In the embodiment, a mode has been shown in which the driving support device 10 includes the recognition processing unit 24, but the present disclosure is not limited to this mode, and an external server device may include the recognition processing unit 24. That is, an external server device may receive the driver's utterance, perform recognition processing, and send the recognition result back to the driving support device 10.

Further, in the embodiment, a mode is shown in which the driver 40 presses the input switch 14 in response to a confirmation voice to input whether or not approval is given, but the present disclosure is not limited to this mode. For example, the driver 40 may input the presence or absence of approval by speaking in response to the confirmation voice.

What is claimed is:

1. A driving support device comprising:
circuitry configured to
    acquire a first input by a driver, the first input including a command to execute a driving support function;
    generate text corresponding to a confirmation voice to be output in response to acquiring the command to execute the driving support function, the text of the confirmation voice including a set keyword;
    output the confirmation voice requesting the driver to approve executing the driving support function;
    acquire a second input by the driver responsive to the confirmation voice, the second input including one of an approval or a disapproval for executing the driving support function; and
    determine whether to execute the driving support function based on whether the second input includes the approval or the disapproval for executing the driving support function, wherein the circuitry
  executes the driving support function in response to determining that the second input includes the approval to execute the driving support function only when the second input including the approval is received after the confirmation voice has output the set keyword.

2. The driving support device according to claim 1, wherein:
  the confirmation voice includes
    the keyword combined with a confirmation phrase, and
    the keyword is precedes the confirmation phrase in the text of the confirmation voice; and
  the circuitry accepts the approval for executing the driving support function after the keyword is output.

3. The driving support device according to claim 1, wherein the keyword indicates a change in control performed when the driving support function is executed in response to the input by the driver.

4. The driving support device according to claim 1, wherein:
  the driving support function is a travel control function related to autonomous driving; and
  the first input from the driver is a voice input.

5. A driving support method, each step of which is executed by a driving support device of a vehicle, the driving support method comprising:
  acquiring a first input by from a driver, the first input including a command to execute a driving support function;
  generating text corresponding to a confirmation voice to be output, the text of the confirmation voice including a set keyword;
  outputting the confirmation voice requesting the driver to approve executing the driving support function in response to acquiring the command to execute the driving support function, the confirmation voice being constituted of text that includes a set keyword;
  acquiring a second input by the driver responsive to the confirmation voice, the second input including one of an approval or a disapproval for executing the driving support function;
  determining whether to execute the driving support function based on whether the second input includes the approval or the disapproval for executing the driving support function; and
  executing the driving support function in response to determining that the second input includes the approval to execute the driving support function only when the second input including the approval is received after the confirmation voice has output the set keyword.

* * * * *